US009821782B2

United States Patent
Kodama et al.

(10) Patent No.: US 9,821,782 B2
(45) Date of Patent: Nov. 21, 2017

(54) MOTOR PUMP

(75) Inventors: Takuro Kodama, Ueda (JP); Tadashi Yamashita, Ueda (JP); Tomohide Tanaka, Ueda (JP)

(73) Assignee: NISSIN KOGYO CO., LTD., Nagano (JP)

( * ) Notice: Subject to any disclaimer, the term of this patent is extended or adjusted under 35 U.S.C. 154(b) by 550 days.

(21) Appl. No.: 13/545,218

(22) Filed: Jul. 10, 2012

(65) Prior Publication Data

US 2013/0017103 A1 Jan. 17, 2013

(30) Foreign Application Priority Data

Jul. 11, 2011 (JP) .................................. 2011-152727

(51) Int. Cl.
| | |
|---|---|
| *F04B 17/03* | (2006.01) |
| *B60T 8/36* | (2006.01) |
| *B60T 8/40* | (2006.01) |
| *H02K 5/14* | (2006.01) |
| *H02K 5/22* | (2006.01) |
| *H02K 7/075* | (2006.01) |

(52) U.S. Cl.
CPC ............ *B60T 8/368* (2013.01); *B60T 8/4022* (2013.01); *F04B 17/03* (2013.01); *H02K 5/148* (2013.01); *H02K 5/225* (2013.01); *H02K 7/075* (2013.01)

(58) Field of Classification Search
CPC ..... F04B 27/1063; F04B 17/03; H02K 5/148; H02K 5/225; H02K 7/075; B60T 8/368; B60T 8/4022
USPC ............. 417/410.1; 384/536, 537, 539, 903; 310/148–151, 219–253, 89, 90
See application file for complete search history.

(56) References Cited

U.S. PATENT DOCUMENTS

| | | | | |
|---|---|---|---|---|
| 4,220,882 A | * | 9/1980 | Kohzai et al. ................. | 310/186 |
| 4,575,926 A | * | 3/1986 | McMinn ......................... | 29/598 |
| 5,550,418 A | * | 8/1996 | Chung ........................... | 310/239 |

(Continued)

FOREIGN PATENT DOCUMENTS

| | | |
|---|---|---|
| CN | 101385220 A | 3/2009 |
| EP | 1041700 | 10/2000 |

(Continued)

OTHER PUBLICATIONS

Extended EP Search Report for related Application No. 12175891.6-1756 dated Jan. 26, 2015, 10 pages.

(Continued)

*Primary Examiner* — Peter J Bertheaud
*Assistant Examiner* — Dnyanesh Kasture
(74) *Attorney, Agent, or Firm* — Andrew M. Calderon; Roberts Mlotkowski Safran Cole & Calderon, P.C.

(57) ABSTRACT

A motor pump includes a base body, a pump, and a motor. The motor includes a tubular yoke having a bottom and an opening on a base body side, a bearing, a rotation shaft, a rotor, a commutator, a brush and a brush shaft. The bearing is fitted to an inside of a bearing hole of the base body. The brush holder is fitted to an inside of the yoke and engages with an outer peripheral surface of the bearing. The brush holder and the bearing are disposed so as to be spaced from the base body in an axial direction of the rotation shaft. The motor-side seal member is provided between the yoke and the base body. The base body constitutes a stopper that prevents the brush holder from being extracted from the yoke.

19 Claims, 6 Drawing Sheets

(56) References Cited

U.S. PATENT DOCUMENTS

| | | | |
|---|---|---|---|
| 5,742,109 A | | 4/1998 | Volz et al. |
| 5,895,207 A | * | 4/1999 | Burgdorf et al. .......... 417/410.1 |
| 6,224,169 B1 | * | 5/2001 | Aoki et al. ................. 303/116.4 |
| 6,563,245 B1 | * | 5/2003 | Suzuki ................. B60T 8/4022 310/233 |
| 6,715,925 B2 | * | 4/2004 | Pairone et al. ............... 384/536 |
| 2005/0073559 A1 | * | 4/2005 | Aruga et al. .................... 347/85 |
| 2008/0174192 A1 | * | 7/2008 | Dinkel et al. .................... 310/89 |
| 2008/0251335 A1 | | 10/2008 | Reiner et al. |
| 2010/0329886 A1 | * | 12/2010 | Sung et al. ............... 416/244 R |
| 2011/0241498 A1 | * | 10/2011 | Vedy ............................ 310/68 B |
| 2012/0128287 A1 | * | 5/2012 | Zaaijer et al. ................. 384/448 |
| 2013/0302159 A1 | * | 11/2013 | Grussmann et al. ...... 415/215.1 |

FOREIGN PATENT DOCUMENTS

| | | |
|---|---|---|
| JP | 3078578 B2 | 8/2000 |
| JP | 2004183718 | 7/2004 |
| JP | 2007182191 | 7/2007 |
| WO | WO-9427045 A1 | 11/1994 |
| WO | WO-9609682 | 3/1996 |
| WO | WO-9817514 | 4/1998 |
| WO | WO-2007039472 | 4/2007 |

OTHER PUBLICATIONS

Chinese Office Action for related Application No. 201210402311.1 dated Feb. 4, 2015, 14 pages.

* cited by examiner

MOTOR PUMP

CROSS-REFERENCE TO RELATED APPLICATION(S)

This application is based upon and claims the benefit of priority from Japanese Patent Application No. 2011-152727, filed on Jul. 11, 2011; the entire contents of which are incorporated herein by reference.

BACKGROUND

1. Technical Field

The invention relates to a motor pump including a pump provided in a base body and a motor that drives the pump.

2. Description of the Related Art

Examples of a motor pump for use in a vehicle brake hydraulic pressure control apparatus include one which includes a base body formed with a brake fluid pathway, a pump that suctions brake fluid from a reservoir formed inside the base body, and a motor that drives the pump and is mounted on an outer surface of the base body.

For example, JP 3078578 B2 (which is a counterpart of WO 94/27045 and U.S. Pat. No. 5,895,207) describes a motor of a motor pump includes a yoke, a rotation shaft, a brush, and a brush holder. The yoke has an opening on a base body side. The rotation shaft is pivotally supported by a bearing provided inside the base body. The brush supplies electricity to a commutator mounted on the rotation shaft. The brush holder holds the brush. Also, the brush holder is jointed to an outer surface of the base body.

SUMMARY

In the motor pump described in JP 3078578 B2, vibration which is caused when the motor is driven is easily transmitted to the base body via the brush holder and the bearing. As a result, vibration of the entire motor pump is large.

Embodiments of the invention deal with the phenomenon that vibration of the entire motor pump is large and provide a motor pump making it harder for vibration, which is caused when a motor is driven, to be transmitted to a base body.

According to one embodiment of the invention, a motor pump includes a base body, a pump, and a motor. The pump is provided inside the base body. The motor drives the pump. The motor includes a tubular yoke, a bearing, a rotation shaft, a rotor, a commutator, a brush, and a brush holder. The tubular yoke has a bottom, and an opening on a base body side. The bearing is fitted to an inside of a bearing hole of the base body. The rotation shaft is pivotally supported by the bearing. The rotor and the commutator are mounted on the rotation shaft. The brush supplies electricity to the commutator. The brush holder holds the brush. The brush holder is fitted to an inside of the yoke and engages with an outer peripheral surface of the bearing. The brush holder and the bearing are disposed so as to be spaced from the base body in an axial direction of the rotation shaft. A motor-side seal member is provided between the yoke and the base body. The base body constitutes a stopper that prevents the brush holder from being extracted from the yoke.

With this configuration, the brush holder and the bearing are disposed so as to be spaced from the base body in the axial direction of the rotation shaft. The motor-side seal member absorbs vibration, which is caused when the motor is driven. Therefore, it is harder for the vibration, which is caused when the motor is driven, to be transmitted to the base body.

Also, when the yoke is attached to the base body, the brush holder is disposed to be spaced from an outer surface of the base body with facing the outer surface of the base body. Therefore, the outer surface of the base body can prevent the brush holder from being extracted from the yoke.

In the motor pump described above, the base body may be formed with a pump hole in which a member constituting the pump is mounted, and the pump hole may communicate with the bearing hole. In this case, it is preferable that a bearing-side seal member is disposed between the outer peripheral surface of the bearing and an inner peripheral surface of the bearing hole.

There is a case that a part, which is movable when the pump is operating, flows operating fluid from the pump hole to the bearing hole. However, with the above configuration, the bearing-side seal member can prevent the operating fluid from flowing out beyond the bearing to the inner side of the motor.

Also, since the bearing-side seal member absorbs the vibration, which is caused when the motor is driven, the vibration of the entire apparatus can be further suppressed.

In the motor pump described above, the brush holder may be integrally fixed to the outer peripheral surface of the bearing by insert molding. In this case, since the brush holder and the bearing can be attached to the base body simultaneously, workload required for assembly can be reduced.

Also, when the motor is positioned with respect to the base body, the bearing fixed to the brush holder of the motor is positioned with respect to the base body as well. Therefore, work efficiency in attaching the bearing can be enhanced.

In the motor pump described above, a protrusion portion may be provided on the outer peripheral surface of the bearing, and the protrusion portion may be sandwiched between the brush holder and the bearing-side seal member. In this case, the brush holder can be easily engaged with the bearing, and the bearing is positioned between the protrusion portion and the bearing-side seal member. Therefore, displacement of the bearing can be prevented.

In the motor pump according to embodiments of the invention, it is harder for vibration, which is caused when a motor is driven, to be transmitted to a base body. Therefore, the vibration of the entire apparatus can be suppressed. Also, the stopper, which prevents the brush holder from being extracted, can be constituted by attaching the yoke to the base body.

DETAILED DESCRIPTION

Exemplary embodiments of the invention will be described in detail below with reference to the accompanying drawings.

In the exemplary embodiments, a vehicle brake hydraulic pressure control apparatus will be described as an example of a motor pump. Also, in the description on the exemplary embodiments, the same reference signs will be assigned to the same elements, and redundant description thereon will be omitted, (First Embodiment)

Figure 1:
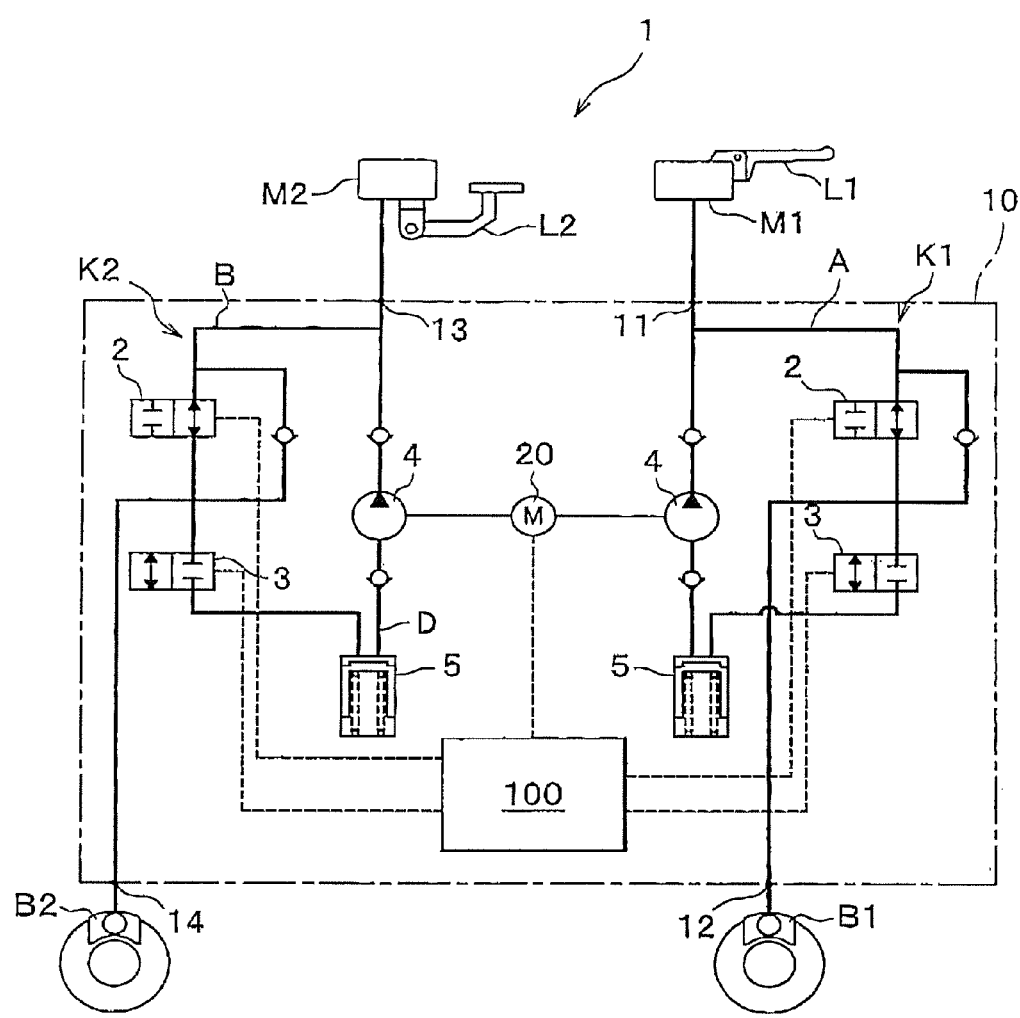
FIG. 1 is a fluid pressure circuit diagram of a vehicle brake hydraulic pressure control apparatus according to a first embodiment.

A vehicle brake hydraulic pressure control apparatus 1 (an example of motor pump) shown in FIG. 1 is suitable for use in a bar handle type vehicle such as a motorcycle, a automatic three-wheeler, and an all terrain vehicle (ATV).

The vehicle brake hydraulic pressure control apparatus 1 includes brake systems K1 and K2 having brake fluid pathways A and B connecting master cylinders M1 and M2 and wheel cylinders B1 and B2. The vehicle brake hydraulic pressure control apparatus 1 includes a base body 10, inlet valves 2, outlet valves 3, reservoirs 5, plunger pumps 4, a motor 20 and a control device 100. The brake fluid pathways A and B are formed in the base body 10. The inlet valves 2 and the outlet valves 3 axe mounted on the base body 10. The reservoirs 5 and the plunger pumps 4 are provided inside the base body 10. The motor 20 drives the plunger pumps 4. The control device 100 controls operations of the inlet valves 2, the outlet valves 3 and the motor 20.

The vehicle brake hydraulic pressure control apparatus 1 appropriately controls brake fluid pressures applied to the wheel cylinder B1 mounted on a front brake and the wheel cylinder 132 mounted on a rear brake, to thereby enable antilock braking control of the respective wheel cylinders B1 and B2.

The front brake system K1 is used to brake the front wheel and is a system leading from an inlet side connection hole 11 to an outlet side connection hole 12. A brake pipe leading to the master cylinder M1 serving as a fluid pressure source is connected to the inlet side connection hole 11. Also, a brake pipe leading to the wheel cylinder B1 is connected to the outlet side connection hole 12.

A brake lever L1 serving as a brake operator is connected to the master cylinder M1 of the front brake system K1.

The rear brake system K2 is used to brake the rear wheel and is a system leading from an inlet side connection hole 13 to an outlet side connection hole 14. A brake pipe leading to the master cylinder M2 serving as another fluid pressure source than the master cylinder M1 is connected to the inlet side connection hole 13. Also, a brake pipe leading to the wheel cylinder B2 is connected to the outlet side connection hole 14.

A brake lever L2 serving as a brake operator is connected to the master cylinder M2 of the rear brake system K2.

The plunger pumps 4 suction brake fluids accumulated in the reservoirs 5 and discharge the brake fluid to the brake fluid pathways A and Bon. the master cylinder M1, M2 sides.

The motor 20 serves as a common power source for the both plunger pumps 4, 4 and is an electrical part that operates based on commands from the control device 100.

The control device 100 is configured to control the operations of the inlet valves 2, the outlet valves 3, and the motor 20 based on an output from a wheel speed sensor, to thereby change the brake fluid pressures in the brake fluid pathways A and B.

Next, the antilock braking control performed by the vehicle brake hydraulic pressure control apparatus 1 will be described.

Since control in the front brake system K1 is the same as that in the rear brake system K2, the control in the front brake system K1 will be described in the following description, and the control in the rear brake system K2 will be omitted.

The control device 100 performs the antilock braking control when the wheel connected the wheel cylinder B1 skids and the wheel is about to lock in a state where the brake lever L1 is operated and the brake fluid pressure acts on the wheel cylinder B1.

If the control device 100 determines that the brake fluid pressure acting on the wheel cylinder B1 should be reduced, the inlet valve 2 is closed and the outlet valve 3 is opened. Thereby, the brake fluid which is on the wheel cylinder B1 side of the inlet vale 2 flows out to the reservoir 5 side through the outlet valve 3, the brake fluid is accumulated in the reservoir 5, and the brake fluid pressure acting on the wheel cylinder B1 is decreased.

If the control device 100 determines that the brake fluid pressure acting on the wheel cylinder B1 should be kept, the inlet valve 2 and the outlet valve 3 are closed. Thereby, since the brake fluid is trapped in a fluid pathway closed by the inlet vale 2 and the outlet valve 3, the brake fluid pressure acting on the wheel cylinder B1 is kept.

If the control device 100 determines that the brake fluid pressure acting on the wheel cylinder B1 should be increased, the inlet valve 2 is opened and the outlet valve 3 is closed. Also, the plunger pump 4 is driven to suction the brake fluid from the reservoir 5 and discharge the suctioned brake fluid to the brake fluid pathway A on the master cylinder M1 side. Thereby, the brake fluid pressure, which is generated in the master cylinder M1 by the operation of the brake lever L1, acts on the wheel cylinder BI through the inlet valve 2, and the brake fluid pressure acting on the wheel cylinder B1 is increased.

Next, the base body 10, the two plunger pumps 4, 4, and the motor 20 of the vehicle brake hydraulic pressure control apparatus 1 will be described in detail.

Figure 3:
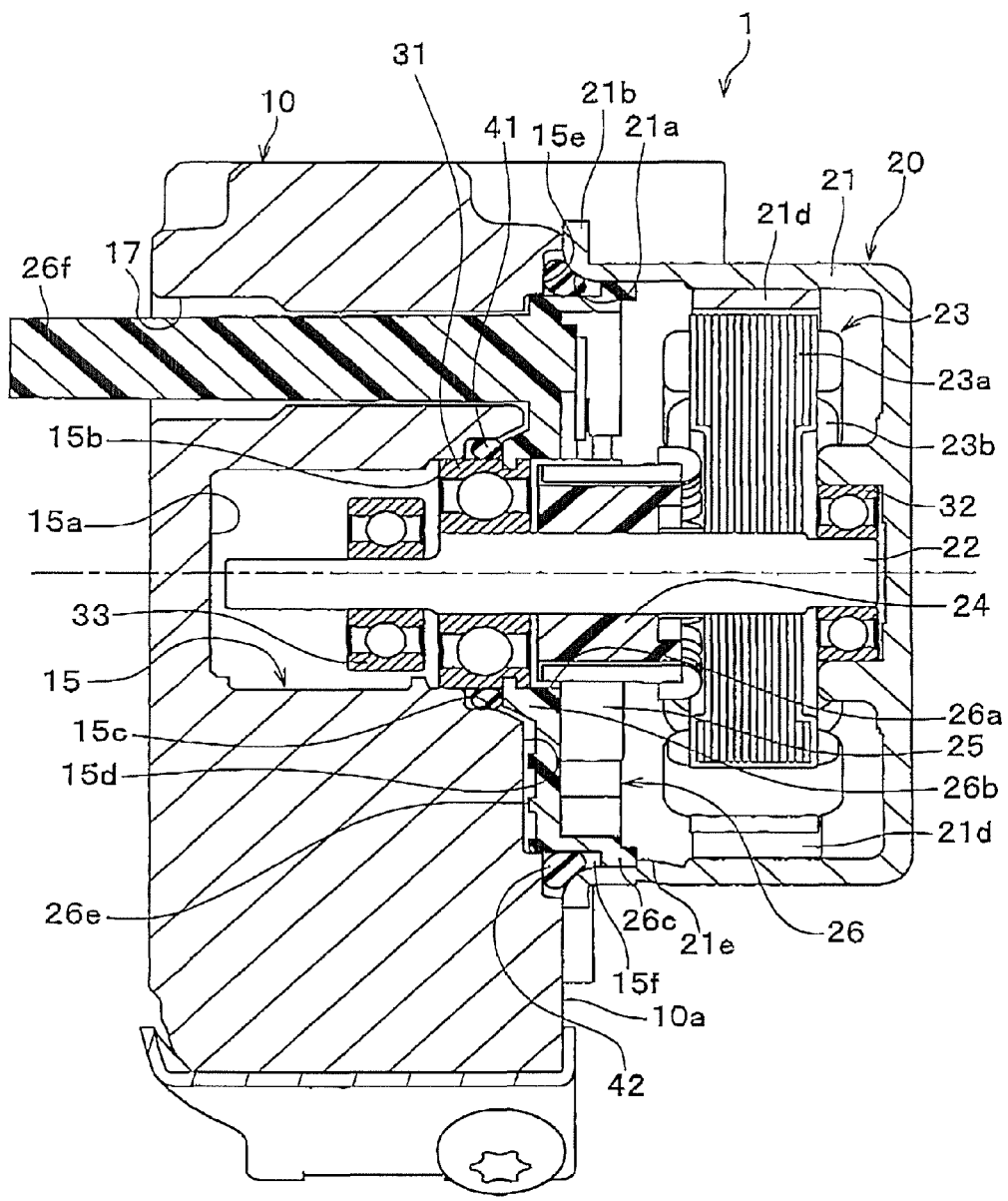
FIG. 3 shows of the vehicle brake hydraulic pressure control apparatus according to the first embodiment, taken along a line III-III in FIG. 2.

As shown in FIG. 3, the base body 10 is a metal part which is a substantial cuboid and is mounted on a vehicle. In the base body 10, the brake fluid pathways A and B (see FIG. 1) are formed of plural holes such as a bearing hole 15, pump holes 16 (see FIG. 4), an inlet valve mounting hole, and an outlet valve mounting hole.

The bearing hole 15, which has a circle shape in section, is formed in a central part of one surface 10a of the base body 10. The bearing hole 15 is a hole portion which has a bottom and into which a rotation shaft 22 of the motor 20 (which will be described in detail later) is inserted. A first bearing 31 is fitted to an inside of an opening portion of the bearing hole 15.

A fitting portion 15b an inside of which the first bearing 31 is fitted to is formed in the opening portion of the bearing hole 15. In a state where the first bearing 31 is fitted to the inside of the opening portion of the bearing hole 15 (in this embodiment, the inside of the fitting portion 15b), an outer peripheral surface of the first bearing 31 is in contact with an inner peripheral surface of the bearing hole 15 (specifically, an inner peripheral surface of the opening portion; more specifically, an inner peripheral surface of the fitting portion 15b). Also, on the one surface 10a side of the fitting portion 15b, a bearing-side seal receiving portion 15c, which has a larger diameter than the fitting portion 15b, is formed in the base body 10.

On the one surface 10a of the base body 10, a recess portion 15d is formed to surround the bearing-side seal receiving portion 15c. A motor-side seal receiving portion 15e is formed at an opening edge portion of the recess portion 15d.

Figure 4:
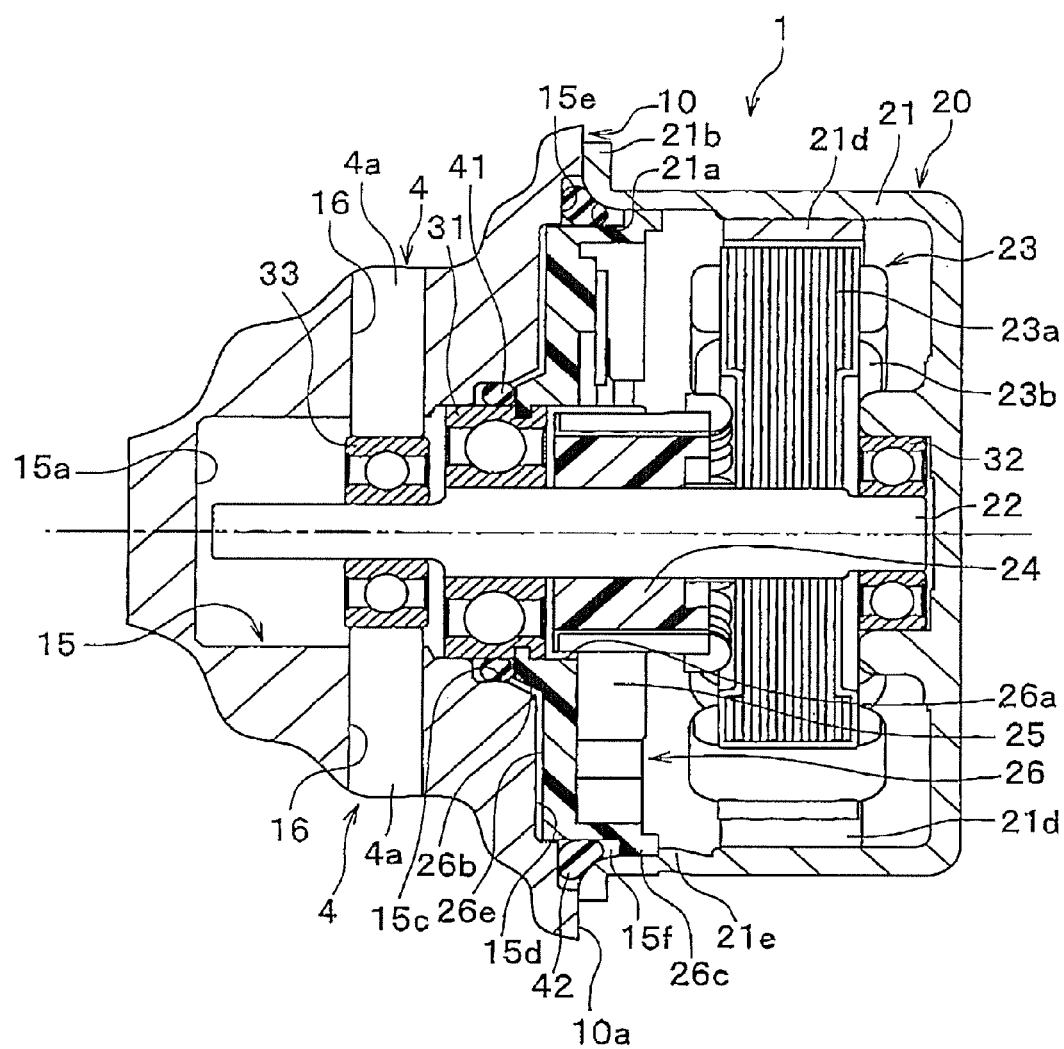
FIG. 4 shows of the vehicle brake hydraulic pressure control apparatus according to the first embodiment, taken along a line IV-IV in FIG. 2.

As shown in FIG. 4, each pump hole 16 is a hole portion that constitutes a cylinder of the plunger pump 4 and has a circle shape in section. Each pump hole 16 communicates with the bearing hole 15 and opens in a side surface of the base body 10. In the first embodiment, the two pump holes 16, 16 are formed on a coaxial line across the bearing hole 15 so as to lead from the both side surfaces of the base body 10 toward a central portion of the base body 10.

The both pump holes 16, 16 communicate with the bearing hole 15 on a bottom surface 15a side of a position where the bearing 31 is fitted to the inside of the base body 10 (on a deeper side (left side on the paper of FIG. 4) of the base body 10 than the position where the bearing 31 is fitted to the inside of the base body 10).

Each plunger pump 4 includes a plunger 4a that is slidably mounted in the pump hole 16 and has a circle shape in section. Each plunger 4a defines a pump chamber in the pump hole 16. Then, each plunger pump 4 is configured so that the plunger 4a reciprocates in the pump hole 16 in the axial direction whereby the plunger pump 4 suctions the brake fluid into the pump chamber and discharges the brake fluid from the pump chamber.

The motor 20 includes a cylinder yoke 21, the first bearing 31, the rotation shaft 22, a rotor 23, a commutator 24, a brush 25 and a brush holder 26. The cylinder yoke 21 has a bottom and opens on the one surface 10a side of the base body 10. The first bearing 31 is fitted to the inside of the bearing hole 15. The rotation shaft 22 is pivotally supported by the first bearing 31. The rotor 23 and the commutator 24 are mounted on the rotation shaft 22. The brush 25 supplies electricity to the commutator 24. The brush holder holds the brush 25.

Figure 2:
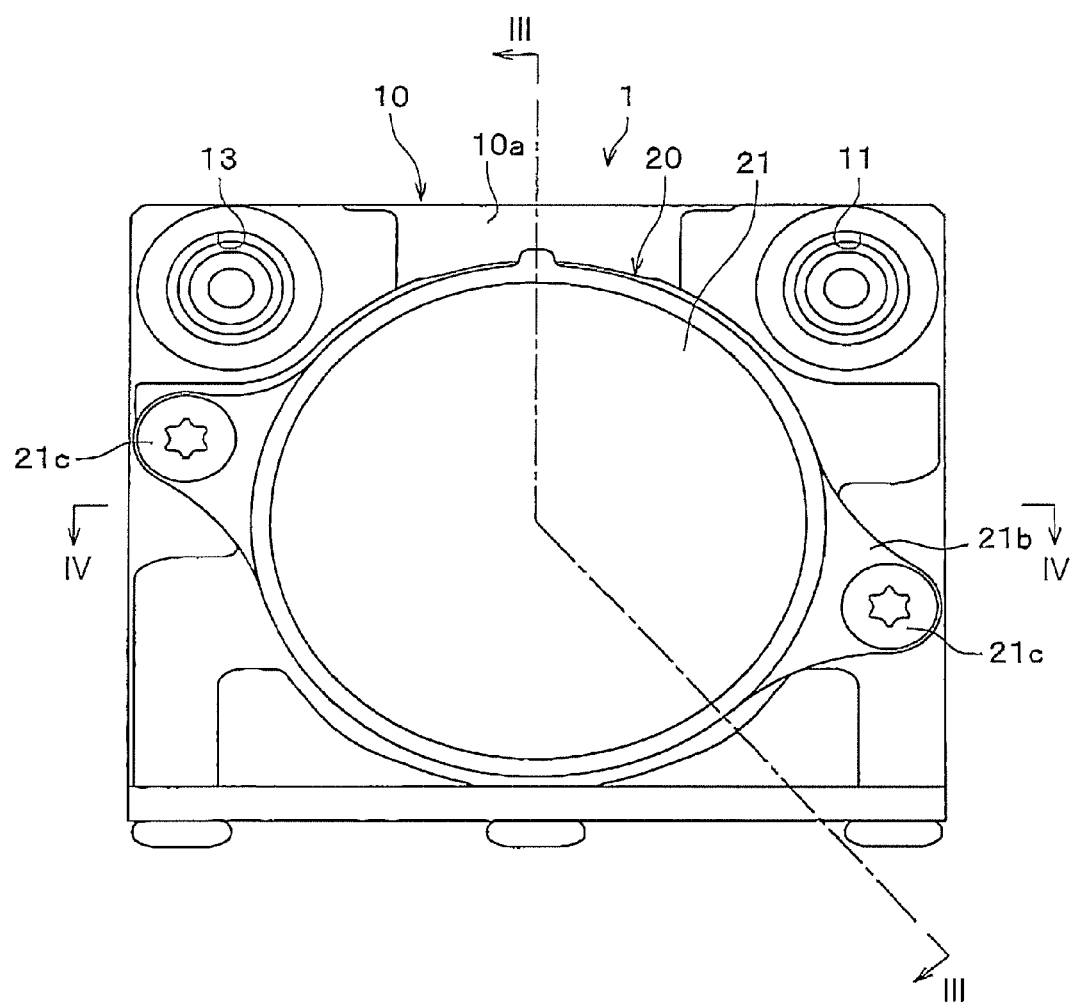
FIG. 2 is a front view of the vehicle brake hydraulic pressure control apparatus according to the first embodiment.

The yoke 21 is a cylindrical part having the bottom. The yoke 21 is formed with a flange portion 21b, which protrudes outward in a diameter direction, at an end portion thereof on an opening portion 21a side. As shown in FIG. 2, the flange portion 21b is attached by bolts 21c to the one surface 10a of the base body 10, to thereby fix the yoke 21 to the one surface 10a of the base body 10. Also, as shown in FIG. 3, a plurality of magnets 21d are mounted on an inner peripheral surface of the yoke 21 in a circumferential direction.

The first bearing 31 is fitted to the inside of the fitting portion 15b of the bearing hole 15 whereby the first bearing 31 is positioned in the diameter direction. Also, a bearing-side seal member 41, which is mounted in the receiving-side seal receiving portion 15c, is fitted to an outside of the first bearing 31. In a state where the bearing-side seal member 41 is fitted to the outside of the first bearing 31, an inner peripheral surface of the bearing-side seal member 41 is in contact with an outer peripheral surface of the first bearing 31. Furthermore, the first bearing 31 is disposed so as to be spaced from the base body 10 in the axial direction of the rotation shaft 22 (the bearing hole 15). That is, a gap is formed between (i) the first bearing 31 and (ii) the bottom surface 15a and a bottom of the fitting portion 15b.

The bearing-side seal member 41 is an annular resin part having elasticity. The bearing-side seal member 41 is disposed in a compression state between the outer peripheral surface of the first bearing 31 and an inner surface of the bearing-side seal receiving portion 15c. The bearing-side seal member 41 liquid-tightly seals a space between the outer peripheral surface of the first bearing 31 and the inner peripheral surface of the bearing hole 15.

Also, the outer peripheral surface (outer ring) of the first bearing 31 and an inner peripheral portion 26b of the brush holder 26 (which will be described in detail later) are integrally formed by the insert molding.

The rotation shaft 22 is a shaft member having a circle shape in section. A portion of the rotation shaft 22 on one end side thereof (on the right side on the paper of FIG. 3) is inserted into the yoke 21. A portion of the rotation shaft 22 on the other end side thereof (on the left side on the paper of FIG. 3) is inserted into the bearing hole 15. The one end of the rotation shaft 22 is pivotally supported by a second bearing 32 provided in the yoke 21. Also, the portion of the rotation shaft 22 on the other end side is pivotally supported by the first bearing 31.

The other end of the rotation shaft 22 is decentered from a center of the rotation shaft 22 (which is represented by clashed lines in FIGS. 3 to 6). An eccentric cam 33 is fitted to an outside of the decentered portion of the rotation shaft 22. In a state where the eccentric cam 33 is fitted to the outside of the decentered portion of the rotation shaft 22, an inner peripheral surface of the eccentric cam 33 is in contact with an outer peripheral surface of the decentered portion of the rotation shaft 22. Therefore, the eccentric cam 33 orbits the center of the rotation shaft 22 as the rotation shaft 22 rotates.

End surfaces of the plungers 4a, 4a abut against an outer peripheral surface (outer ring) of the eccentric cam 33. Then, when the eccentric cam 33 orbits the center of the rotation shaft 22 and the outer peripheral surface of the eccentric cam 33 displaces to the plunger 4a side, the plunger 4a is pushed by the eccentric cam 33 to move forward. Also, when the outer peripheral surface of the eccentric cam 33 displaces in a direction away from the plunger 4a, the plunger 4a is pushed by a spring member provided in the pump hole 16, to move backward. In this manner, when the rotation shaft 22 is rotated, the both plungers pumps 4, 4 are driven.

The rotor 23 is fitted to an outside of a portion of the rotation shaft 22 on an outer end side (the one end side) thereof, at a position corresponding to the magnets 21d. In a state where the rotor 23 is fitted to the outside of the portion of the rotation shaft 22 on the outer end side thereof, an inner peripheral portion of the rotor 23 is in contact with an outer peripheral surface of the portion of the rotation shaft 22 on the outer end side thereof. The rotor 23 includes coils 23b formed by winding magnetic wires on slots of a laminated core 23a. Furthermore, the commutator 24 is disposed on an inner end side (the other end side) of the rotor 23 and is fitted to the outside of the rotation shaft 24. In a state where the commutator 24 is fitted to the outside of the rotation shaft 24, an inner peripheral surface of the commutator 24 is in contact with the outer peripheral surface of the rotation shaft 24. The commutator 24 is electrically connected to the coils 23b.

Figure 5:
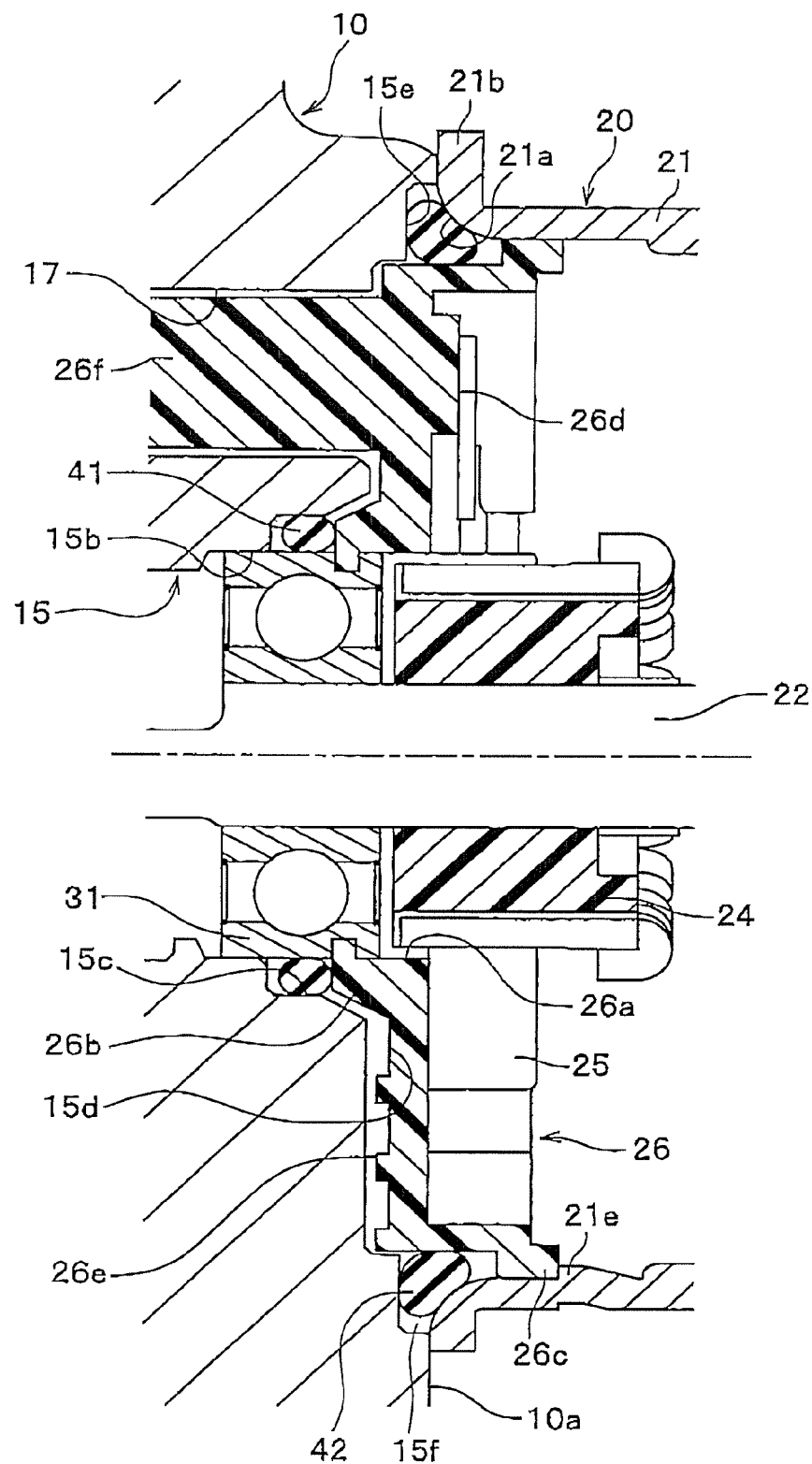
FIG. 5 is a partial enlarged section view showing a motor pump according to the first embodiment.

As shown in FIG. 5, the brush holder 26 is a circular plate member that is fitted to an inside of the opening portion 21a of the yoke 21. In a state where the brush holder 26 is fitted to the inside of the opening portion 21a of the yoke 21, an outer peripheral surface of the brush holder 26 (specifically, an engagement portion 26c) is in contact with the inner peripheral surface of the opening portion 21a of the yoke 21. A center hole 26a is formed in the brush holder 26. The inner peripheral portion 26b of the brush holder 26 is integrally fixed to the outer peripheral surface of the first bearing 31 by the insert molding. The annular engagement portion 26c is formed in an outer peripheral edge portion of the brush holder 26.

In the brush holder 26, the plurality of brushes 25 are attached to a surface 26d which is on a bottom portion side of the yoke 21. Each brush 25 is in contact with the outer peripheral surface of the commutator 24.

Also, in the brush holder 26, a terminal support portion 26f is formed on a surface 26e on the base body 10 side. The terminal support portion 26f is inserted into a terminal insertion hole 17 formed in the base body 10.

Terminals (not shown), which are electrically connected to a board of the control device 100 (see FIG. 1), are embedded in the terminal support portion 26f. Electricity is supplied to the respective brushes 25 via the terminals.

The engagement portion 26c of the brush holder 26 is fitted to the inner peripheral surface of the yoke 21. Thereby, the brush holder 26 is positioned in the diameter direction.

Also, the engagement portion 26c engages with a protrusion portion 21e formed in the inner peripheral surface of the yoke 21. Thereby, the brush holder 26 is prevented from moving toward the bottom portion side of the yoke 21. In the first embodiment, the protrusion portion 21e is formed by the press working (half piercing), which presses an outer peripheral surface of the yoke 21 so that the yoke 21 protrudes on the inner peripheral surface side.

In a state where the engagement portion 26c engages with the protrusion portion 21e (an end face of the engagement portion 26c abuts against the protrusion portion 21e), the brush holder 26 is spaced from the one surface 10a of the base body 10 in the axial direction of the rotation shaft 22. That is, the surface 26e, on the base body 10 side, of the brush holder 26 faces the one surface 10a of the base body 10 with a gap therebetween.

The gap between the brush holder 26 and the base body 10 is set so that even if the brush holder 26 moves toward the base body 10 side, the brush holder 26 abuts against the base body 10 to thereby prevent the brush holder 26 from being extracted from the yoke 21.

In a state where the motor 20 is attached to the one surface 10a of the base body 10, an annular space 15f surrounded by the opening portion 21a of the yoke 20, the engagement portion 26c of the brush holder 26 and the motor-side seal receiving portion 15e of the base body 10 is formed.

A motor-side seal member 42 is an annular resin part having elasticity. The motor-side seal member 42 is disposed in a compression state among the opening portion 21a of the yoke 20, the engagement portion 26c of the brush holder 26 and the motor-side seal receiving portion 15e of the base body 10.

Then, the motor-side seal member 42 liquid-tightly seals (i) between the yoke 21 and the base body 10, (ii) between the brush holder 26 and the base body 10, and (iii) between the brush holder 26 and the yoke 21.

In the vehicle brake hydraulic pressure control apparatus 1 described above, the brush holder 26 and the first bearing 31 are disposed so as to be spaced from the based body 10 in the axial direction of the rotation shaft 22 as shown in FIG. 5. Also, vibration, which is caused when the motor 20 is driven, is absorbed by the motor-side seal member 42 and the bearing-side seal member 41. In this manner, since it is harder in the vehicle brake hydraulic pressure control apparatus 1 for the vibration, which is caused when the motor 20 is driven, to be transmitted to the base body 10, vibration of the entire apparatus can be suppressed.

Also, when the base body 10 is attached to the yoke 21, the brush holder 26 is disposed to face the base body 10.

Therefore, the base body 10 can prevent the brush body 26 from being extracted from the yoke 21, to thereby constitute a stopper that prevents the brush holder 26 from being extracted.

Accordingly, even if a member such as a housing for retaining the brush holder 26 is not used, the stopper which prevents the brush holder 26 from being extracted from the yoke 21 can be constituted. Therefore, the number of parts in the vehicle brake hydraulic pressure control apparatus 1 can be reduced, and manufacturing cost can be reduced. Also, since the respective parts, of the motor 20 can be disposed on the base body 10 side, the size of the apparatus as a whole can be reduced.

Also, as shown in FIG. 4, even if the brake fluid flows out from the pump hole 16 to the bearing hole 15 due to the reciprocation of the plunger 4a while the plunger pumps 4 are operating, the bearing-side seal member 41 can prevent the brake fluid from flowing out beyond the first bearing 31 to the inner side of the motor 20 (the inside of the yoke 21).

Also, as shown in FIG. 3, the inner peripheral portion 26b of the brush holder 26 is integrally fixed to the first bearing 31 by the insert molding, and the brush holder 26 and the first bearing 31 can be attached to the base body 10 simultaneously. Therefore, workload required for assembly can be reduced.

Also, when the motor 20 is positioned with respect to the base body 10, the first bearing 31 fixed to the brush holder 26 of the motor 20 is positioned in the bearing hole 15 as well. Therefore, work efficiency in attaching the first bearing 31 can be enhanced.

The first embodiment of the invention has been described above. However, it should be noted that the invention is not limited to the first embodiment, but may be modified in various manners without departing from the gist of the invention.

In the first embodiment, as shown in FIG. 5, the brush holder 26 engages with the first bearing 31 by the insert molding. However, the configuration that engages the brush holder 26 with the first bearing 31 is not limited thereto.

Also, the motor-side seal member 42 may be sandwiched between the base body 10 and the inner surface 26e of the brush holder 26. With this configuration, the brush holder 26 is pushed outward (to the right side on the paper in FIG. 3) by the elastic force of the motor-side seal member 42. Therefore, the engagement portion 26c of the brush holder 26 surely engages with the protrusion portion 21e of the yoke 21.

Also, in the first embodiment, the vehicle brake hydraulic pressure control apparatus 1 for use in a bar handle type vehicle has been described as shown in FIG. 1 as one example of the motor pump of the invention. However, the motor pump of the invention is applicable to various types of vehicle brake hydraulic pressure control apparatuses such as a brake hydraulic pressure control apparatus for an automatic four-wheel vehicle. Furthermore, the motor pump of the invention is not limited to the vehicle brake hydraulic pressure control apparatus.

Also, in the first embodiment, the plunger pumps 4 are used. However, the configuration of the pumps is not limited thereto.

As described above, the motor pump of the invention is applicable to various devices so long as each device has a base body, a pump provided inside the base body, and a motor that drives the pump.

(Second Embodiment)

Next, a vehicle brake hydraulic pressure control apparatus (an example of a motor pump) according to a second embodiment will be described.

Figure 6:
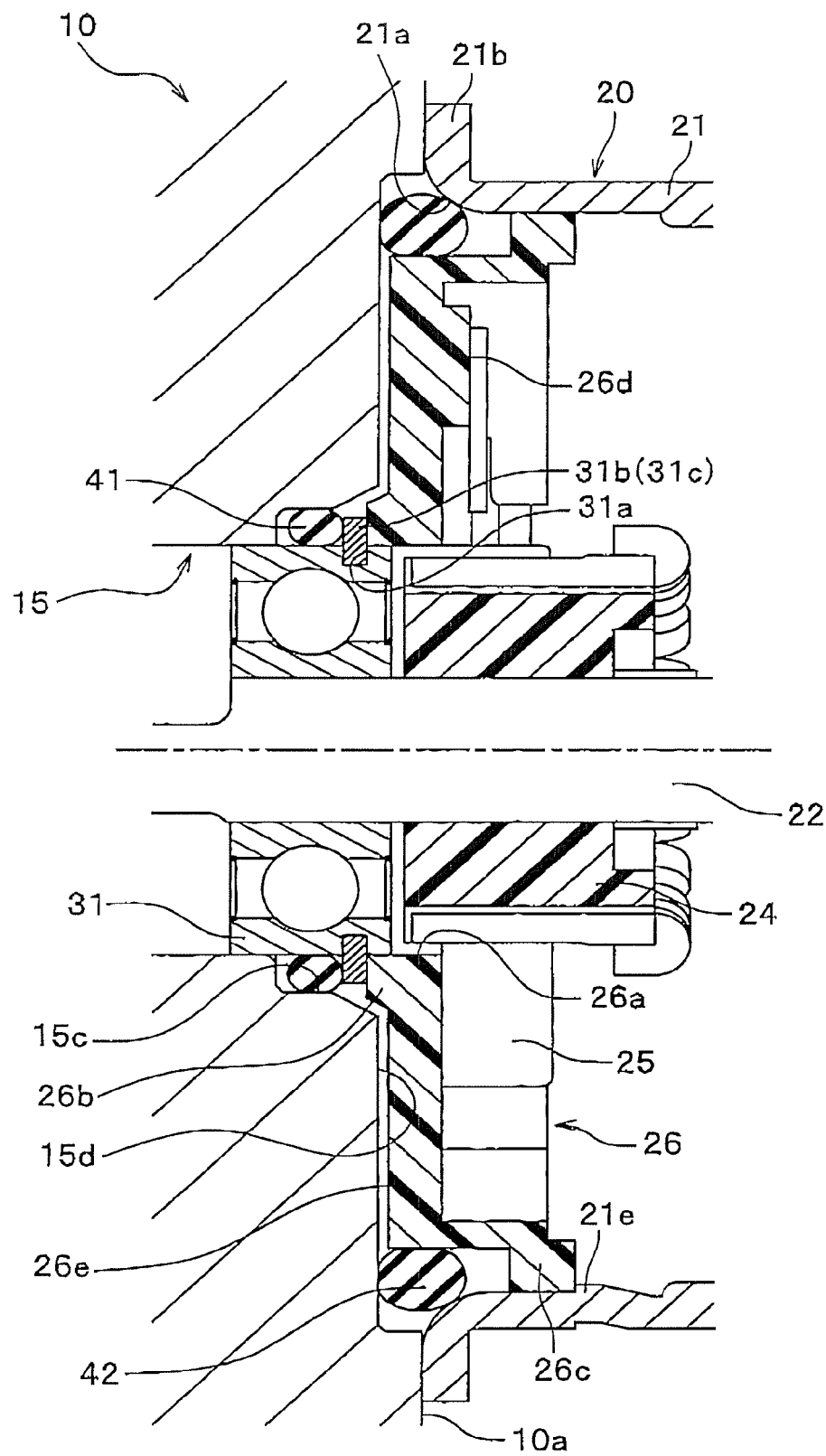
FIG. 6 is a partial enlarged section view showing a motor pump according to a second embodiment.

As shown in FIG. 6, in the vehicle brake hydraulic pressure control apparatus according to the second embodiment, a recess groove 31a is formed in the outer peripheral surface (outer ring) of the first bearing 31 so as to extend in the circumferential direction. When a stopper ring 31b having a C shape is fitted to the recess groove 31a, an outer peripheral portion of the stopper ring 31b constitutes a protrusion portion 31c on the outer peripheral surface of the first bearing 31.

Then, the protrusion portion 31c is sandwiched between the bearing-side seal member 41 and the inner peripheral portion 26b of the brush holder 26, to thereby engage the brush holder 26 with the first bearing 31.

With this configuration, the brush holder 26 can be easily engaged with the first bearing 31, and the protrusion portion 31c of the first bearing 31 is positioned between the brush holder 26 and the bearing-side seal member 41. Therefore, displacement of the first bearing 31 can be prevented.

In the vehicle brake hydraulic pressure control apparatus according to the second embodiment, the stopper ring 31b constitutes the protrusion portion 31c on the outer peripheral surface of the first bearing 31. However, the configuration of the protrusion portion is not limited thereto. For example, the protrusion portion may be provided by forming a projection portion on the outer peripheral surface of the first bearing 31.

Also, in the vehicle brake hydraulic pressure control apparatus according to the second embodiment, the motor-side seal member 42 may be sandwiched between the base body 10 and the inner surface 26e of the brush holder 26 as in the first embodiment.

Furthermore, in the second embodiment, the vehicle brake hydraulic pressure control apparatus 1 has been described as another example of the motor pump as in the first embodiment. However, the motor pump having the configuration according to the second embodiment is applicable to various apparatuses.

What is claimed is:

1. A motor pump comprising: a base body;
a pump provided inside the base body; and a motor that drives the pump, wherein the motor includes
a tubular yoke that has a bottom, and
an opening on a base body side,
a bearing that is fitted to an inside of a bearing hole of the base body, a rotation shaft that is pivotally supported by the bearing, a rotor and a commutator that are mounted on the rotation shaft, a brush that supplies electricity to the commutator, and a brush holder that holds the brush,
the brush holder is fitted to an inside of the yoke and engages with an outer peripheral surface of the bearing,
the brush holder and the bearing are disposed such that (i) the brush holder is spaced away from the base body with respect to at least an axial direction of the rotation shaft and (ii) the bearing is spaced away from the base body with respect to the axial direction of the rotation shaft such that the brush holder and the bearing make contact with the base body only via surfaces that are parallel to the axis of rotation, a motor-side seal member is provided between the yoke and the base body, and the base body constitutes a stopper that prevents the brush holder from being extracted from the yoke,
the brush holder includes an engagement portion on an outer peripheral edge portion thereof, the engagement portion is fitted to the inner peripheral surface of the yoke so that the brush holder is fitted to the inner peripheral surface of the yoke,
the yoke includes a first protrusion portion on the inner peripheral surface thereof,
the engagement portion of the brush holder abuts against the first protrusion portion of the yoke, and
the yoke includes a second protrusion portion on the inner peripheral surface thereof adjacent to magnets.

2. The motor pump according to claim 1, wherein a bearing-side seal member is disposed between the outer peripheral surface of the bearing and an inner peripheral surface of the bearing hole.

3. The motor pump according to claim 1, wherein
the base body is formed with a pump hole in which a member constituting the pump is mounted,
the pump hole communicates with the bearing hole, and
a bearing-side seal member is disposed between the outer peripheral surface of the bearing and an inner peripheral surface of the bearing hole.

4. The motor pump according to claim 1, wherein the brush holder is integrally fixed to the outer peripheral surface of the bearing by insert molding.

5. The motor pump according to claim 2, wherein
a third protrusion portion is provided on the outer peripheral surface of the bearing, and
the third protrusion portion is sandwiched between the brush holder and the bearing-side seal member.

6. The motor pump according to claim 1, wherein a gap is formed between the bearing and a bottom surface of the bearing hole so that the bearing is spaced from the base body in the axial direction of the rotation shaft.

7. The motor pump according to claim 1, wherein the motor-side sealing member is disposed among the yoke, the base body, and the brush holder.

8. The motor pump according to claim 1, further comprising a fitting portion formed in an opening portion of the bearing hole, wherein the bearing is fitted directly against an inside of the fitting portion.

9. The motor pump according to claim 8, wherein an outer peripheral surface of the bearing is in contact with an inner peripheral surface of the fitting portion.

10. The motor pump according to claim 9, further comprising
a bearing-side seal receiving portion formed on one surface side of the fitting portion, the receiving portion having a larger diameter than the fitting portion, and
a recess portion formed to surround the bearing-side seal receiving portion on another surface of the base body.

11. The motor pump according to claim 10, further comprising a motor-side seal receiving portion formed at an opening edge portion of the recess portion.

12. The motor pump according to claim 11, wherein
a bearing-side seal member, which is mounted in the bearing-side seal receiving portion, is fitted to an outside of the bearing, and
an inner peripheral surface of the bearing-side seal member is in contact with an outer peripheral surface of the bearing.

13. The motor pump according to claim 12, wherein
the bearing-side seal member is an annular resin part having elasticity, the bearing-side seal member is disposed in a compression state between an outer peripheral surface of the bearing and an inner surface of the bearing-side seal receiving portion, and the bearing-side seal member fluid-tightly seals a space between the outer peripheral surface of a first bearing and the inner peripheral surface of the bearing hole.

14. The motor pump according to claim 13, wherein
one end of the rotation shaft is pivotally supported by a second bearing provided in the yoke,
an end of the rotation shaft is decentered from a center of the rotation shaft,
an eccentric cam is fitted to an outside of the decentered portion of the rotation shaft, and
an inner peripheral surface of the eccentric cam is in contact with an outer peripheral surface of the decentered portion of the rotation shaft.

15. The motor pump according to claim 10, wherein
the brush holder is a circular plate member that is fitted to an inside of an opening portion of the yoke,
an engagement portion is formed in an outer peripheral edge portion of the brush holder,
a center hole is formed in the brush holder, and
the inner peripheral portion of the brush holder is integrally fixed to the outer peripheral surface of the bearing by insert molding.

16. The motor pump according to claim 15, wherein
in the brush holder, a terminal support portion is formed on a surface on a side of the base body, the terminal support portion is inserted into a terminal insertion hole formed in the base body, the engagement portion of the brush holder is fitted to an inner peripheral surface of the yoke such that the brush holder is positioned in a diameter direction, and
the first protrusion portion is formed by a press working, which presses an outer peripheral surface of the yoke so that the yoke protrudes on the inner peripheral surface side.

17. The motor pump according to claim 16, wherein
in a state where an end face of the engagement portion engages with the first protrusion portion, the brush holder is spaced from the one surface of the base body in the axial direction of the rotation shaft.

18. The motor pump according to claim 17, wherein
in a state where the motor is attached to the one surface of the base body, an annular space surrounded by the opening portion of the yoke, the engagement portion of the brush holder and a motor-side seal receiving portion of the base body is formed.

19. a recess groove is formed in an outer peripheral surface of the bearing so as to extend in a circumferential direction,
a stopper ring having a C shape is fitted to the recess groove,
an outer peripheral portion of the stopper ring constitutes a third protrusion portion on the outer peripheral surface of the bearing, and
the third protrusion portion is sandwiched between a bearing-side seal member and an inner peripheral portion of the brush holder, to thereby engage the brush holder with the bearing.

* * * * *